United States Patent [19]
Müller

[11] 3,987,985
[45] Oct. 26, 1976

[54] DEVICE FOR SEALING OFF FUSELAGE GAP OF AIRCRAFT

[75] Inventor: Günter Müller, Gauting, Germany

[73] Assignee: Messerschmitt-Bolkow-Blohm GmbH, Munich, Germany

[22] Filed: July 17, 1975

[21] Appl. No.: 596,620

[30] Foreign Application Priority Data
Aug. 13, 1974 Germany............................ 2438739

[52] U.S. Cl. ................................................. 244/46
[51] Int. Cl.$^2$............................................ B64C 1/14
[58] Field of Search........................... 244/46, 45 A; 114/201 A; 24/205.17, 205.19, 33 P, 33 M; 292/302; 49/477

[56] References Cited
UNITED STATES PATENTS

| | | | |
|---|---|---|---|
| 3,324,991 | 6/1967 | Voss | 24/33 P |
| 3,480,237 | 11/1969 | Appleby | 244/46 |

Primary Examiner—Trygve M. Blix
Assistant Examiner—Barry L. Kelmachter
Attorney, Agent, or Firm—Woodhams, Blanchard and Flynn

[57] ABSTRACT

A device for sealing the fuselage gap in a variable geometry aircraft. The fuselage gap is designed to receive part of the movable wing on the aircraft. The seal is in contact with the upper and lower wing surfaces near the inboard trailing edge section so that the fuselage gap is effectively sealed during flight. The seal is constructed of an air bellows with a triangular-shaped cross section and a plurality of partition walls therein, each partition wall being filled with air passageways in order to allow equlization of air pressure within the bellows. The partition walls are connected to one of the outer sheath walls of the bellows through a hinge-like connection. The hinge consists of numerous loops with a hinge pin protruding through the loops to interlock the concerned outer wall of the bellows with the partition walls. In another embodiment, a one-piece, elastic wire is threaded through the loops of all partition walls consecutively. The partition walls may be connected to the outer bellows sheath also through a force-locking device.

6 Claims, 8 Drawing Figures

3,987,985

DEVICE FOR SEALING OFF FUSELAGE GAP OF AIRCRAFT

FIELD OF THE INVENTION

The invention relates to a device for sealing off a fuselage gap in aircraft, which fuselage gap is adapted to receive part of a movable wing which can be swung into and out of the fuselage gap. Aircraft of the aforementioned type usually leave on both sides of the fuselage adjacent to the wings, gaps or recesses, to allow the wings to partly penetrate into the fuselage when swept backwards. In order not to worsen the aerodynamic characteristics of variable geometry aircraft, which would result in a loss of lift and an increased drag, it is necessary to seal off satisfactorily the fuselage gap in each position of the movable wing. The attainment of this object is more problematic in high-power aircraft since critical environmental influences e.g. extreme temperatures and dynamic excitation have to be dealt with.

BACKGROUND OF THE INVENTION

A pertinent device of the above-mentioned type is described and illustrated in German OS 2 113 775. This known sealing device is characterized by an air bellows being fitted to both the upper and the lower edges of the fuselage gap. Each air bellows is constructed in one piece. The two air bellows are associated with one another such that they contact one another or overlap partly when the movable wing is swung out from the fuselage gap. The air bellows have partition walls which are arranged in lateral direction and which extend parallel to one another to give the bellows, in the inflated condition, the necessary stability of shape.

The air bellows consist of a flexible, resilient material in order to satisfactorily function as a sealing device. Basically one uses herefore suitable plastics or rubber in foil shape, which can be reinforced by a resilient fiber material, and which are usually fixed to rigid base plates and/or are connected directly with the aircraft structure.

The inventive device is a seal for seaing off a fuselage gap in aircraft, which gap is adapted to receive a wing which can be swung partly into the fuselage gap. The fuselage gap is to be sealed off in each position of the wings by means of inflatable, flexible air bellows which have their outer surfaces shaped as to line up with the overall shape of the aircraft fuselage when in the inflated condition. The air bellows are arranged in pairs with respect to one another, so that they contact one another when the wing is in the swung-out configuration. One air bellows is connected on both the upper and lower edges of the fuselage gap. Each one contains partition walls on the inside thereof oriented in lateral direction and, parallel to one another with openings therethrough.

Due to the relatively complicated structure of the air bellows, it is difficult to simultaneously satisfy all requirements demanded from them during manufacture and installation. They are to have a low weight and be sufficiently stable, robust and also flexible.

To attain this purpose, the air bellows shall be manufactured with a triangular-shaped cross section and the partition walls fixedly connected to the bellows along two edges, while the third edge is connected to the associated bellows wall through a form-closed mechanism. The form-closed mechanism consists preferably of one hinge.

This structure has decisive manufacturing and technological advantages. During manufacture the partition walls can be connected on two edges to the two adjacent sheath wall surfaces easily since access is possible from the third, open sidewall. The connection at these edges may be formed by bonding, curing, sewing or welding. The third wall of the air bellows is connected to the free edges of the partition walls, for example, through hinges, after which the overlapping peripheral edges are, as a last operation, sealed off e.g. by bonding.

Important advantages are derived from the invention:

1. Considerable weight savings compared with air bellows comprising the base plate concept because a third elastic wall is usually much lighter than rigid plates and the hinges are considerably smaller and lighter than the clamping strips in the case of base plates. The load absorption in the hinge construction is much more favorable than in a clamping connection.

2. Easier sealing capability on the periphery because plastic is, for example, bonded against plastic, in particular rubber against rubber and not, for example, rubber against a solid base plate material of possible bad adhesive compatibility.

3. Greater flexibility of the entire construction and thus smaller risk of damage and easier mountability in the aircraft.

4. All resultants of pressure loads in the bellows are cancelled toward the outside. Deformations of the originally plane outer surfaces occur hereby. A completely elastic system adopts these deformations easier than a composite method of construction containing rigid elements, which during operation always requires the use of special clamping conditions which resist deformation and breakage.

5. The manufacture of the bellows may be conducted within the same branch. Rubber companies are as a rule not familiar with aircraft building techniques, for example, riveting.

6. Easier disassembly for repairs. No danger of destroying the base plates during drilling of rivets.

7. Easy manufacturability, during assembly of the premanufactured components an adjusting error is not possible.

8. All in all, approximately 40% less expensive compared with conventional constructions.

The hinges are advantageously arranged on the wall of the air bellows, which is attached to the fuselage structure and does not suffer any deformations. Otherwise, difficulties with respect to a sufficient flexibility of the air bellows and wear problems could be generated during operation.

DETAILED DESCRIPTION

Figure 1:
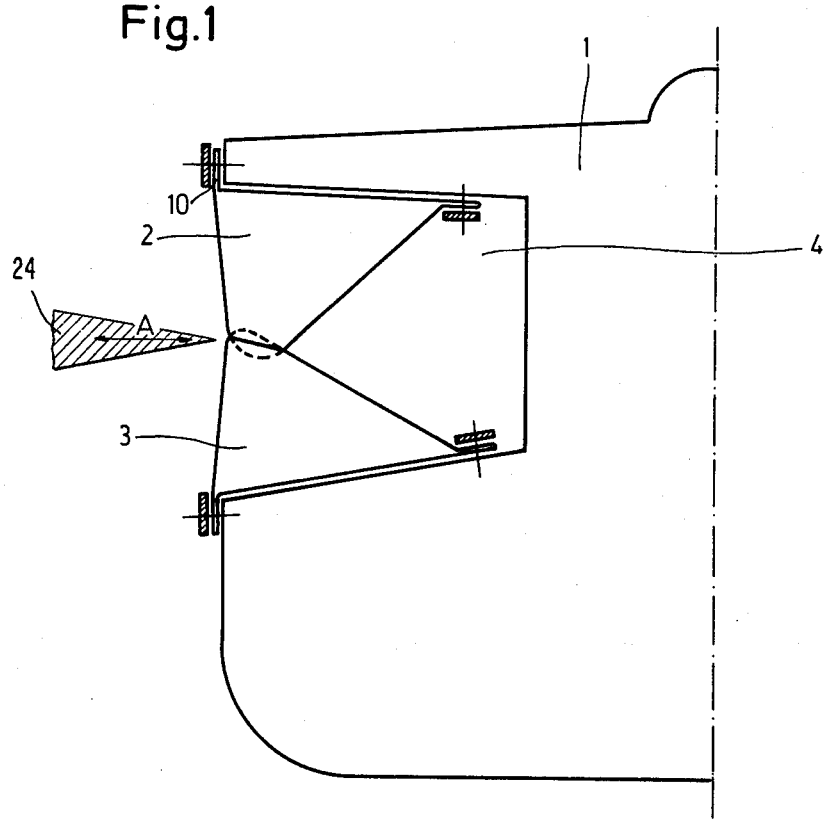
FIG. 1 is a schematic cross-sectional view of the sealing device of a fuselage gap.

In FIG. 1, reference numeral 1 identifies an aircraft fuselage. A pair of air bellows 2 and 3 are arranged symmetrically with respect to one another in a fuselage gap 4 for the purpose of sealing off the fuselage gap 4, in each position of a movable wing parts 24 of which sweeps into and out of the gap 4 in direction of the arrow A.

Figure 2:
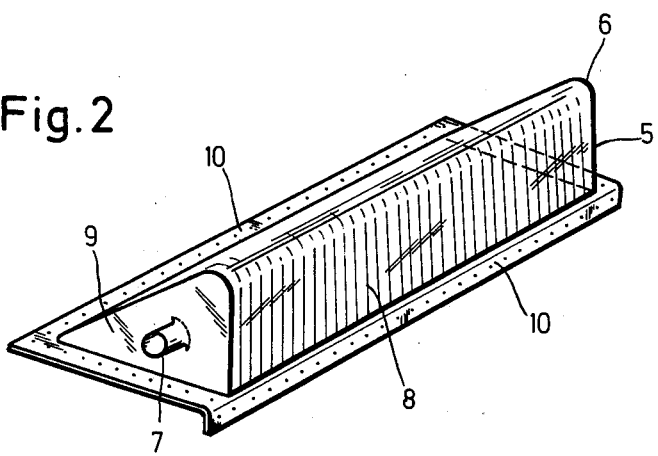
FIG. 2 is a perspective view of an air bellows.

FIG. 2 illustrates a triangularly shaped air bellows 5, the apex or free edge 6 of which extends, in the installed condition according to FIG. 1, to the central area of the fuselage gap 4 and contacts the (symmetrically) oppositely positioned second bellows along the corresponding apex thereof. It is possible to uniformly supply the bellows 5 with pressurized air through an air intake port 7 since the partition walls within the bellows, which (indicated schematically by the lines 8 (FIG. 2) produce the respective cross section of the bellows are equipped with openings. The partition walls are arranged parallel with respect to one another as well as to a forward wall 9 of the bellows 5 respectively. The flange 10 running around the periphery of the bellows 5 seals off the top and bottom bellows components against each other and simultaneously is used as a holding fixture of the bellows to secure the bellows to the fuselage 1 in the fuselage gap 4 as schematically indicated in FIG. 1.

Figure 3:
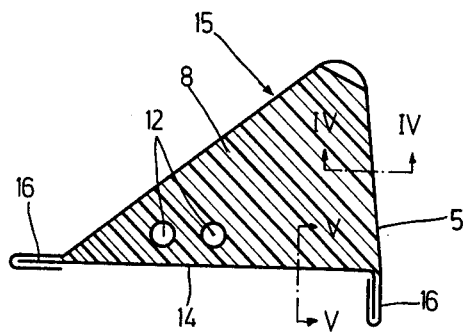
FIG. 3 is a cross-sectional view of a schematically illustrated air bellows.

The structural design of the inventive air bellows and its manufacturing procedure are discussed in FIGS. 3 to 8. The cross-sectional view as illustrated in FIG. 3 shows one of the partition walls 8 having air openings 12 therein. The type of openings is of course not limited to the illustrated type. It is, for example, also possible to construct the partition walls 8 as nets instead of impermeable sheets having holes therein. The air bellows 5 according to FIG. 3 consists of a flat bottom element 14 and a trough-shaped top element 15. Elements 14 and 15 together form the bellows 5. The edges of the elements 14 and 15 are overlapped along their edges 16. The overlapped edges are screwed, riveted, sewn or bonded together.

Figure 4:
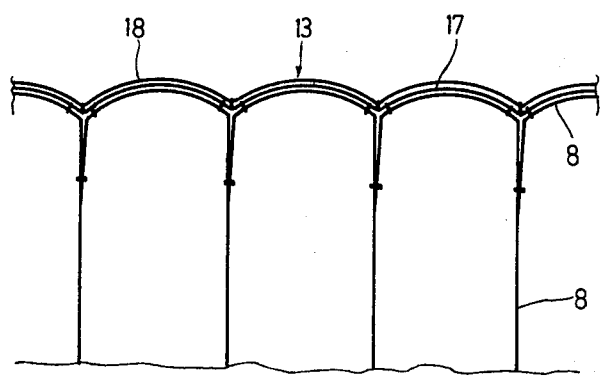
FIG. 4 is a cross-sectional view taken along the line IV—IV of FIG. 3.

FIG. 4 illustrates the structure of a three-layer outer skin 13 of the air bellows 5. The partition walls 8 oerlap one another and are attached to a supporting intermediate layer 17 and an outer friction layer 18, which outer layer 18 usually does not absorb any primary loads. If the partition walls 8 are not bonded or welded to the intermediate layer 17, but are, instead or additionally, riveted or sewn together, the outer layer 18 should be sewn as well in order to avoid separation effects caused by air penetrating between the individual layers. As a result of this outer sewing, a controlled permeability can be achieved, which extensively prevents a local pressure build-up in the multilayer compound.

Figure 5:
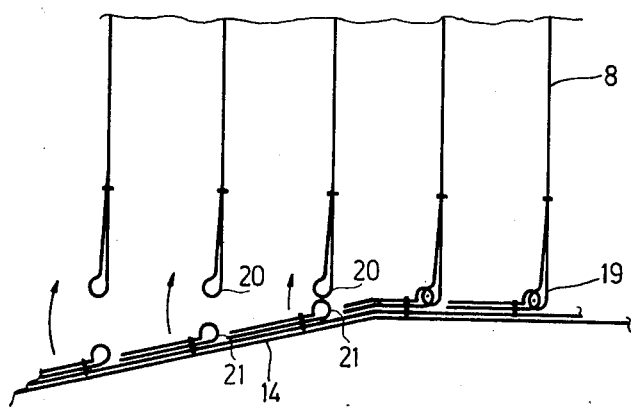
FIG. 5 is a cross-sectional view taken along the line V—V of FIG. 3.
Figure 6:
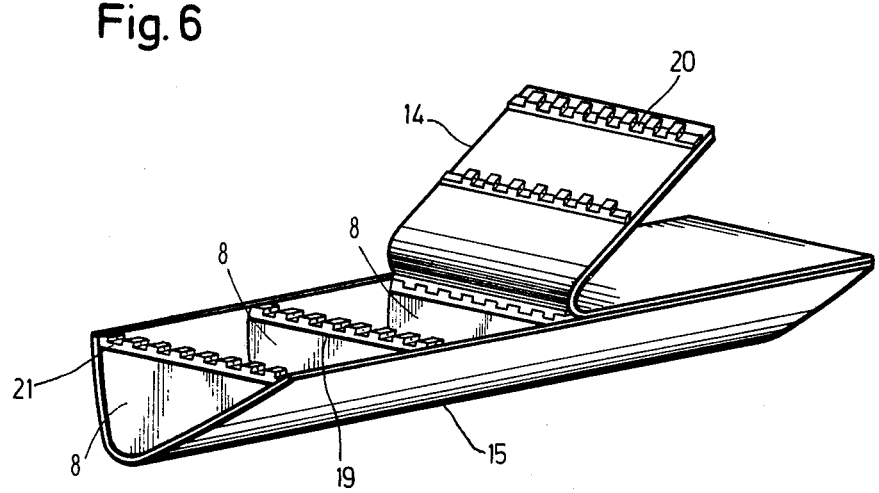
FIG. 6 is a perspective illustration to explain the manufacture of the air bellows.
Figure 7:
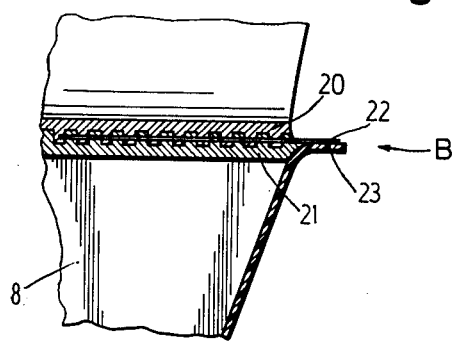
FIG. 7 is a fragmentary sectional view of a connecting element according to FIG. 6 with locking pin partly inserted.
Figure 8:
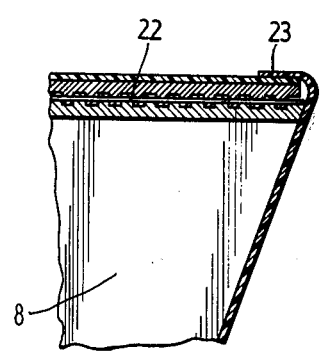
FIG. 8 is a further fragmentary sectional view of the connecting element.

FIG. 5 in principle illustrates how the free edges 19 of the partition walls 8 are connected to the base element 14. According to FIG. 6, the base element 14 is rolled back such that it can consecutively be joined together with the free edges 19 of the partition walls 8. The connection is achieved by a hingelike construction — compare FIG. 7. As soon as the associated hinge loops 20,21 are in alignment, a rod 22 can be inserted in the direction of the arrow B (FIG. 7) through the hinge loops for securing the hinge parts 20,21 together. FIG. 8 illustrates the rod 22 in the installed position. A flap 23 covers the outer end of the rod 22 so that an inadvertent release thereof is practically impossible. A further assembly procedure is accomplished by replacing the individual hinge pins 22 by a one-piece, elastic wire, which is successively threaded through the hinge loops.

The design according to FIG. 8 has the advantage that the flap 23 is subjected only to shear loads and not, to peel loads.

Although a specifically preferred layout of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed and defined as follows:

1. A device for sealing a fuselage gap in a variable geometry aircraft, which gap is adapted to receive a rear inboard part of a movable wing in the swung-back position thereof, comprising:
    means defining a pair of elongated, triangular-shaped, inflatable and flexible air bellows, each of said air bellows comprising a base wall and a pair of upstanding sidewalls secured to said base wall at spaced locations and to each other to thereby define a cross section that is triangular in shape;
    means for securing said base wall of each of said air bellows to said fuselage in said gap, the apexes of each of said air bellows contacting one another when said wing is removed from said gap and contacting the lower and upper surfaces of said rear inboard part of said wing when said wing is in said swung-back position;
    at least one partition wall inside said triangular-shaped air bellows and extending transversely to said base wall and said sidewalls of said air bellows, said partition wall having a triangular shape, each of a pair of edges on said partition wall being fixedly secured to said sidewalls of said air bellows; and
    form closed means for securing a third edge of said triangular-shaped partition wall to said base wall.

2. A device according to claim 1, wherein said form-closed means consists of a hinge construction.

3. A device according to claim 2, wherein said hinge construction includes loop means on said base wall and on said third edge and having a one-piece, elastic wire threaded successively through the hinge loops.

4. A device according to claim 2, wherein said hinge construction includes loop means on said base wall and on said third edge and having a hinge pin threaded therethrough.

5. A device according to claim 1, wherein a plurality of partition walls are provided in said air bellows, said partition walls being parallel and a third edge of each of said partition walls being connected to said base wall by said form-closed means.

6. The device according to claim 1, wherein said partition wall has means defining at least one passageway therethrough.

* * * * *